United States Patent [19]

Bücker

[11] 4,105,173

[45] Aug. 8, 1978

[54] INFLATABLE PARACHUTE FOR USE AS ESCAPE OR SPORTING DEVICE

[76] Inventor: Henrique Oswaldo Bücker, P.O. Box 18394, Sao Paulo-Sp, Brazil

[21] Appl. No.: 822,217

[22] Filed: Aug. 5, 1977

Related U.S. Application Data

[63] Continuation-in-part of Ser. No. 694,949, Jun. 11, 1976, abandoned, which is a continuation-in-part of Ser. No. 540,996, Jan. 14, 1975, abandoned, which is a continuation-in-part of Ser. No. 465,709, Apr. 30, 1974, abandoned.

[30] Foreign Application Priority Data

Jan. 16, 1976 [BR] Brazil .................................. 7600243
Nov. 26, 1973 [BR] Brazil .................................. 009238

[51] Int. Cl.² ............................................ B64D 17/72
[52] U.S. Cl. ........................................ 244/146; 182/3; 182/48; 244/147
[58] Field of Search ................ 182/3, 48; 135/20 B; 244/146, DIG. 2, 142, 148, 147, 152; 46/86

[56] References Cited

U.S. PATENT DOCUMENTS

| | | | |
|---|---|---|---|
| 582,377 | 5/1897 | Sly | 244/146 |
| 1,308,375 | 7/1919 | Satre | 244/146 |
| 1,678,537 | 7/1928 | Schonbrun | 244/146 |
| 1,826,245 | 10/1931 | Hammerle | 244/146 |
| 2,111,886 | 3/1938 | Caple | 244/146 |
| 3,335,493 | 8/1967 | Gallagher | 244/152 |
| 3,412,963 | 11/1968 | Struble, Jr. | 244/146 |
| 3,458,009 | 7/1969 | Fvors | 182/48 |
| 3,652,041 | 3/1972 | Vickery | 244/152 |
| 3,819,011 | 6/1974 | Kinaser et al. | 182/48 |

FOREIGN PATENT DOCUMENTS

| | | | |
|---|---|---|---|
| 452,987 | 5/1913 | France | 244/146 |
| 669,986 | 11/1929 | France | 244/146 |
| 311,328 | 9/1933 | Italy | 244/146 |

*Primary Examiner*—Galen L. Barefoot

[57] ABSTRACT

For use as an escape device from burning buildings or for sporting use, a parachute canopy is supported in an open use position by an inflatable frame consisting of a network of inflatable lightweight flexible tubes. The inflatable framework has a portion which surrounds the waist of a user and also embodies an inflatable pre-launching positioning member. Bottled air or gas may be utilized to inflate the device through an inflation valve provided thereon. A restraining belt permits preinflation of the framework such that upon release the canopy expands almost instantaneously by the straightening of folded flexible tubes.

28 Claims, 19 Drawing Figures

INFLATABLE PARACHUTE FOR USE AS ESCAPE OR SPORTING DEVICE

CROSS-REFERENCE TO RELATED APPLICATION

This application is a continuation-in-part of copending application Ser. No. 694,949 filed Jun. 11th, 1976, now abandoned, which is a continuation-in-part of copending application Ser. No. 540,996 filed Jan. 14th, 1975, now abandoned, which is a continuation-in-part of copending application Ser. No. 465,709 filed Apr. 30, 1974, now abandoned.

BACKGROUND OF THE INVENTION

In recent years, many tragic fires in high rise apartment and office buildings have resulted in heavy loss of life for several reasons. The more modern buildings are frequently furnished and constructed with certain parts which are highly inflamable and produce dense smoke, and outside fire escapes are not provided on modern high rise buildings. The usual fire department ladders and towers cannot be extended above eight or nine stories, and therefore there is no escape route for those trapped above this elevation.

In light of the above, it is the object of this invention to provide a simple, safe and economical fire escape device in such a form as can be made readily available to anyone in a building and which is practical and reliable to use without great risk to the user.

SUMMARY OF THE INVENTION

The invention consists of a parachute canopy having a lightweight flexible inflatable tubing frame or support which assures the opening of the parachute quickly, at a time when it is needed, prior to the jump or launching as well as the maintaining of the parachute canopy fully open during the descent to the ground. The device is also suitable for low altitude jumping for sporting or instruction purposes when desired.

Additionally, the invention features a simple and unique spring-like prelaunching positioning means for the escape parachute whereby the parachute will be correctly positioned with respect to the wall of the building so that it will glide away from and clear all balconies or like projections on a building during the initial descent, after which a vertical descent position will be assumed. According to the present invention an inflatable type life saving or sport parachute is disclosed for ejecting from a support such as a building or a slow moving aircraft or a hangglider.

The collapsed deflated parachute may be stored in a readily accessible location in each room of a building along with a pressurized gas or air container of sufficient capacity to inflate the tubular frame-work, through an inflation valve provided thereon.

According to the present invention an inflatable parachute can be quickly pre-inflated inside a room or any site from which the jump is to be effected. The canopy is released to expand almost instantaneously right after the pre-inflated equipment falls a few meters and such release is initiated by its own weight. The inflatable parachute can be pre-inflated and is lighter, less bulkier, and consequently less expansive than conventional inflatable parachute, and in addition, can be inflated with less gas.

These pre-inflatable parachutes herein described present also as advantages the facts that they can be built with conventional or cross canopies; they also provide a descent with less and shorter oscillations as the fall begins in a near vertical trajectory; and that the tubes supporting the canopy, on expanding, act on the building wall pushing away the equipment therefore reducing the danger of accidents.

Other features and advantages of the invention will become apparent during the course of the following detailed description.

DETAILED DESCRIPTION

Figures 1, 2:
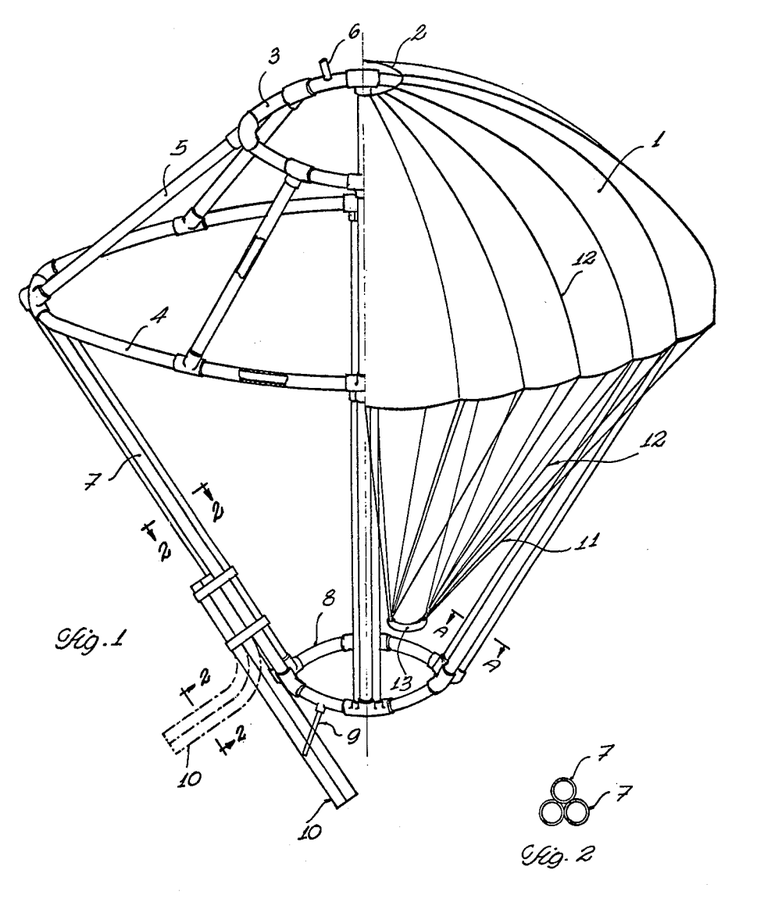
FIG. 1 is a perspective view of an inflatable escape parachute device embodying the invention.
FIG. 2 is a fragmentary cross section taken on lines 2—2 of FIG. 1.

Referring to the drawings in detail, wherein like numbers designate like parts, the numeral 1 designates a parachute canopy having a central apex opening 2. The general idea of one embodiment of the invention is that the canopy 1 is opened and held open during use by an inflatable support structure consisting of a framework of lightweight flexible inflatable tubes. This tubing framework comprises an upper circular or polygonal tube 3 and a lower similar tube 4 of considerably enlarged diameter and arranged concentrically with the upper tube 3. These two elements, when inflated, form supporting frame elements for the top and lower marginal portions of the canopy 1. The tube elements 3 are interconnected at a plurality of circumferentially spaced locations by a plurality of upwardly inclined, converging straight inflatable tube sections 5 whose upper and lower ends are coupled in the tubes 3 and 4 in a gas-tight manner, with the interiors of all of the tubes in communication. The upper inflatable tube or ring 3 is equipped with a safety relief valve 6 which prevents over-inflation of the tubing framework.

At preferably four circumferentially equidistantly spaced points around the inflatable structure, downwardly converging straight equal length clusters or groups of inflatable tubes 7 are provided, with their upper ends coupled into the tube ring 4 and their lower ends correspondingly coupled a lower relatively small size circular or polygonal tube section 8. The three tube sections 3, 4 and 8 lie in parallel planes and the lower tube section 8 is of a size to receive the waist of a user of the device, as shown. The tube section 8 is suspended well below the canopy 1 on the tube cluster 7, as shown. The interiors of the clusters 7 are in direct communication with the elements 8 and 4, and in fact, the entire inflatable tubing framework constitutes a closed chamber or system. The tube section or ring 8 is equipped with a suitable inflation valve 9 through which the tubular framework may be inflated at proper times for use.

Figure 3:
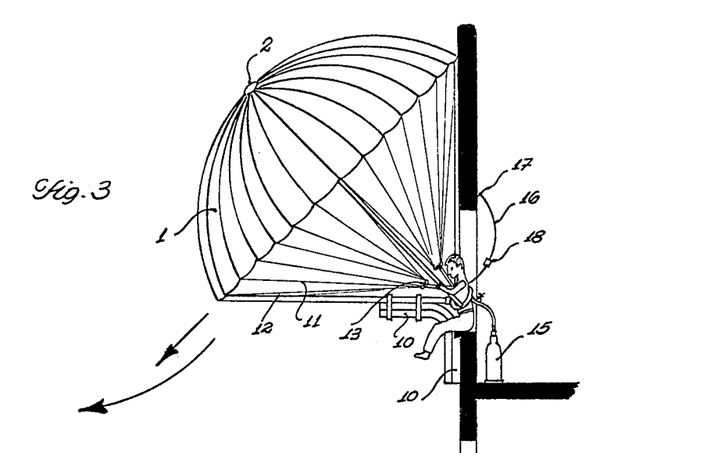
FIG. 3 is a partly schematic elevational view of the escape parachute in a position ready for launching.

As an important feature of the invention, a simplified means to assist in positioning prior to launching the parachute from a building or the like is provided, in the form of another tube cluster 10, suitably secured to one of the clusters 7 and being in internal communication therewith, so as to be inflatable along with the other tubing sections. When inflated, the cluster 10 projects downwardly well below the ring 8. It then constitutes a bendable inflated spring element which deflects to the approximate right angular position shown in broken lines in FIG. 1 and also shown in FIG. 3, helping the equipment to attain the correct launching position with the canopy 1 skirt touching the upper part of the wall as shown in FIG. 3.

Additionally, the parachute shroud embodies a plurality of small size inflatable tubes 11 joined at their tops to the skirt of canopy 1 at the points where the canopy gores are united. These small tubes 11 are connected into the inflatable tubing ring 4 and communicate therewith. To each small diameter tube 11 there is connected a suspension line 12 which extends across the top of the canopy 1 radially, and the lower terminals of these lines pass through "D" tubes 13, tied to a suitable arm and leg harness 14.

The inflatable tubular framework is preferably constructed of lightweight, high tenacity fabric, made impervious by means of resins and/or elastomers. All of the interconnecting tube components form an inflation chamber having a volume of approximately 1.5 cubic meters, to which air or gas pressure of approximately 0.5 kilograms per cubic centimeter can safely be applied.

The device as described permits a safe and reliable escape from a building on fire as well as sporting and instruction jumps from low altitudes. Rates of descent of about five meters per second may be expected depending upon the weight of the user and such descents are quite safe, as determined by actual trials of the invention already carried out.

Referring to FIG. 3, the invention will be stored in a compact uninflated condition in each part of the building, in a canvas container or the like, prior to inflation so that it will occupy a minimum amount of space. The complete equipment will include a bottled air or gas cylinder 15, and a cable 16 secured to a building hook 17. The cable 16 will include a quick disconnect fastener 18 of a known type.

Once the package is opened to free the components, with the cable 16 connected to the hook 17, the user sits on windowsill 19, putting on the body harness 14, and switches on or connects the admission valve 9 to the supply cylinder 15. The impervious tubing frame will immediately inflate and open up the parachute structure fully as shown in FIG. 3. The skirt of the canopy 1 may touch the wall of the building, and the entire parachute will be inclined relative to the building, as shown. At the same time, the prelaunching positioning tubes 10 fold into an L-formation, and exert pressure against the building wall, tending to move the parachute toward its correct launching position, aided by the user's arms' pull on tubes 7.

Figure 4:
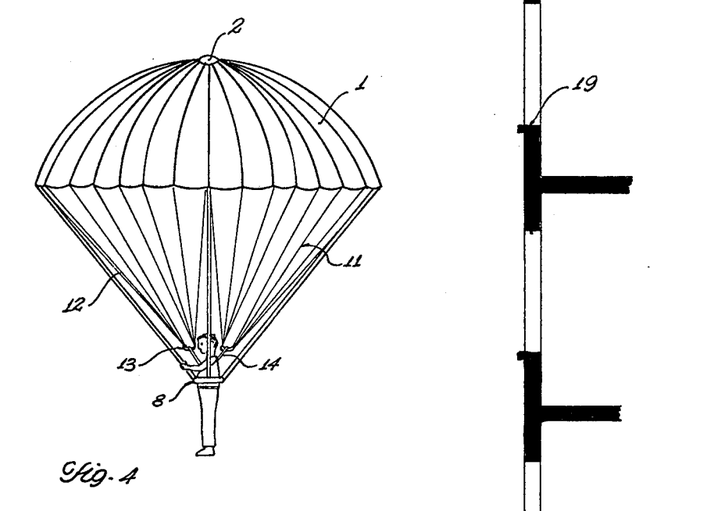
FIG. 4 is a similar view of the parachute during its descent from a building with a user of the device.

At this point, the device is ready and, with the connector 18 open, the user forces himself outwardly from the windowsill 19 with the spring action of the launching tubes 10 assisting in positioning the parachute away from the building during the initial part of the descent so that the danger of scraping or hanging up on protruding parts of the building may be avoided. After the parachute has cleared the building the canopy section will become horizontal and the parachute will straighten up for a normal vertical descent as shown in FIG. 4.

Referring to FIG. 5 through 10, a modification of the invention in a somewhat simpler and less expensive form is disclosed. While being equally reliable in operation with the prior embodiment, the modified form of the invention requires considerably less gas to inflate because a number of inflatable members present in the prior embodiment have been eliminated including the members 3, 4, 5 and 8. Nevertheless, the modified form of the invention possesses essentially the same capabilities of the prior form and operates in approximately the same manner at the time of usage. In both forms, the inflation of the tubular support members serves to reliably expand the parachute canopy ready for usage and in both forms the launching of the device from the building is spring-assisted for additional safety.

More particularly, in FIG. 5 through 10, the parachute canopy 20 has its skirt securely bonded at 21 to the extremities of preferably three circumferentially equidistantly spaced inflatable support beams 22, which are employed instead of the previously described tube clusters 7. The lower ends of the three inflatable beams 22 are joined securely by elastic connectors 23, FIG. 6, which are tubular so that the interiors of the three beams are in communication whereby they may be inflated simultaneously through a single valve means 24 on one of them, FIG. 5.

Figure 5:
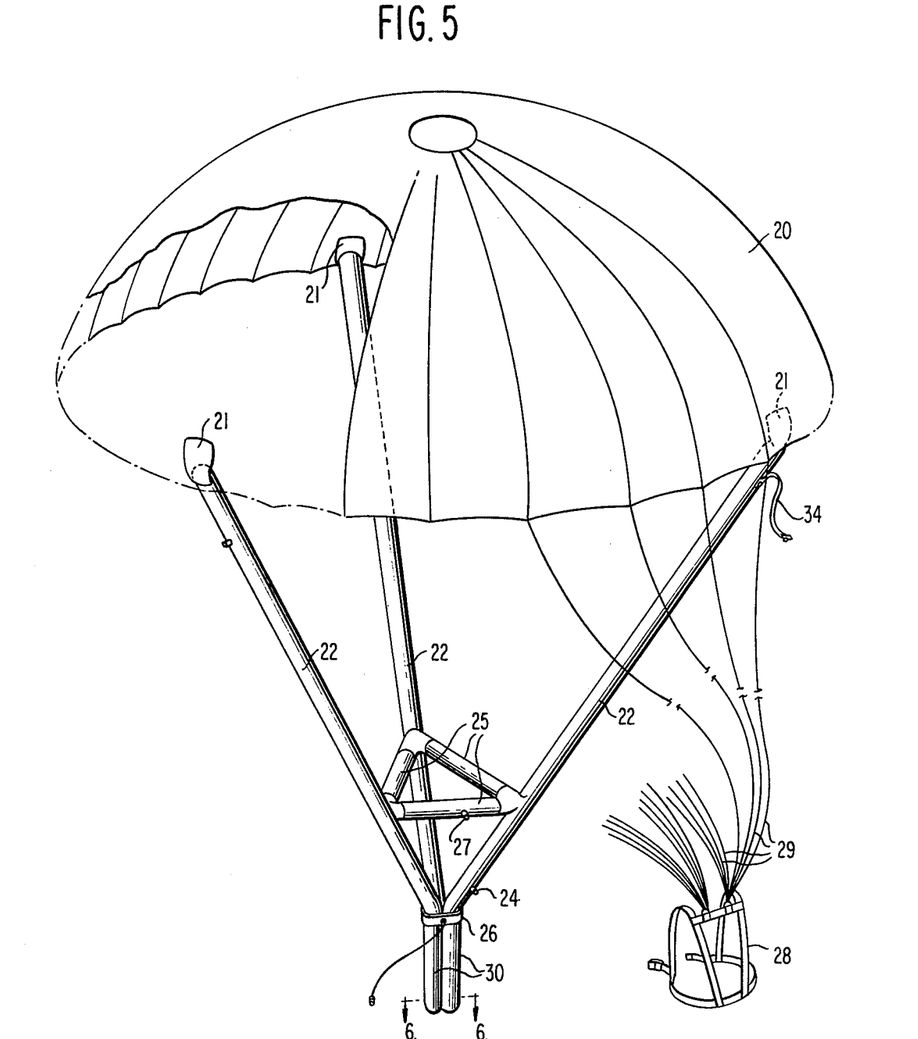
FIG. 5 is a perspective view showing a modified form of inflatable escape parachute, partly broken away.
Figure 6:
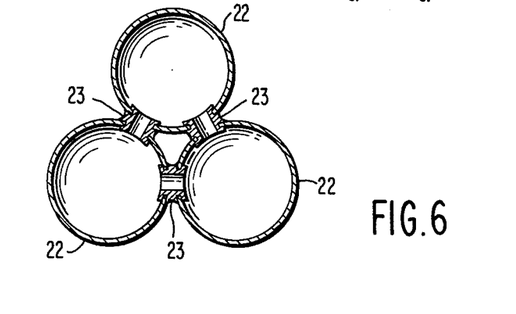
FIG. 6 is an enlarged fragmentary section taken on line 6—6 of FIG. 5.

Additionally, a triangular array of communicating short tubes 25 are joined to the beams 22 near and above a securing belt 26 which binds the lower end portions of the three beams in assembled relationship. The tubes 25 are in communication with one another and are inflated at a proper time separately from the beams 22 through a separate inflation valve 27, as will be further described. The interiors of the tubes 25 and 22 do not communicate.

The escape parachute shown in FIG. 5 additionally includes a suitable body harness 28 rigged to the suspension lines 29 of the parachute canopy in any secure and acceptable manner.

It may now be appreciated that the structure of the preferred form of the parachute device is considerably simpler than the embodiment in FIGS. 1 to 4 and far fewer inflatable members are required with the result that a smaller supply of inflation gas will be adequate. This considerably reduces the cost of the device. The previously-described launching positioning means 10 (FIG. 1) in the form of a separate tube cluster strapped on to one of the beam clusters 7, has now been replaced by a simpler arrangement wherein the contiguous extensions 30 of the three beams 22 below the securing belt 26 constitute the launching positioning means for the device.

Figure 7:
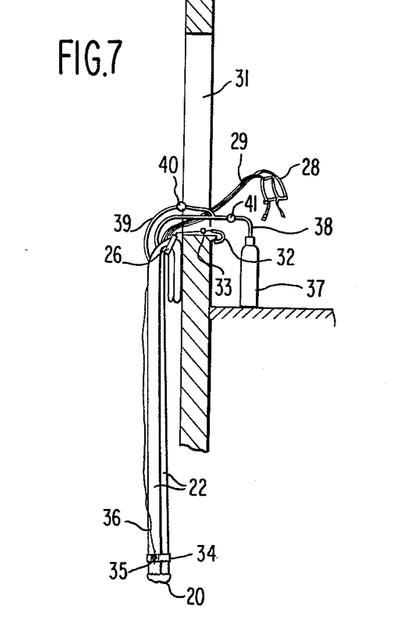
FIG. 7 is a partly schematic elevational view of an escape parachute prior to inflation but after deployment from a building window, parts in section.

FIG. 7 shows the device prior to inflation of the three beams 22 and with the latter suspended limply from the outside of a building window 31 by means of a hook extension 32 on the securing belt 26 which can be provided with a conventional quick-disconnect coupling 33. At this time, the parachute canopy 20 is confined between the uninflated beams 22 and the normal upper end portions of the beams near their points of attachment to the canopy are confined by an elastic band or belt 34 having a clasp and release pin 35, the pin being extracted from the clasp to release automatically the beams 22 at a proper time, to be described, by a trigger or release line 36 connected with the pin.

FIG. 7 also shows a suitable container 37 of pressurized inflation gas having a valved supply line 38 coupled to the inflation valve 24 and a branch supply line 39 with its own control valve 40 coupled to the inflation valve 27.

Figure 8:
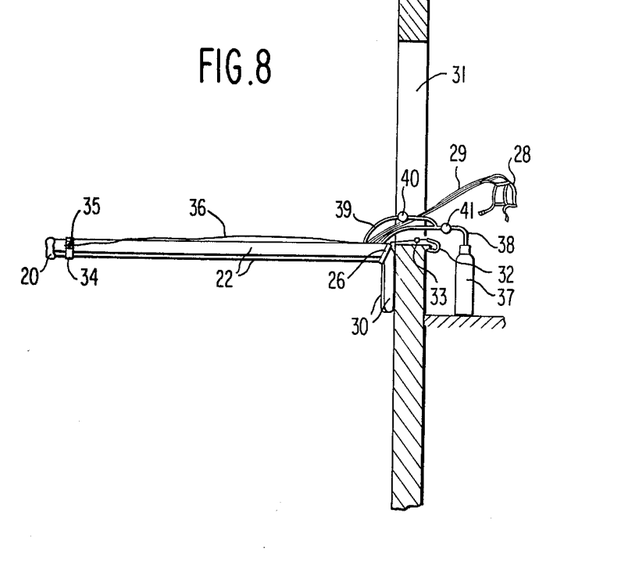
FIG. 8 is a similar view showing the escape parachute device partly inflated while connected with a window ledge and inflation means.

FIG. 8 shows a condition of the device after partial inflation of the three beams 22 by operation of the first inflation gas control valve 41. At this time, the structure will stand out normal to the building wall and the parachute canopy remains confined with the beams 22 due to the action of the band 34. As in FIG. 7, the hook extension 32 is in secure engagement with the window ledge or sill.

Figure 9:
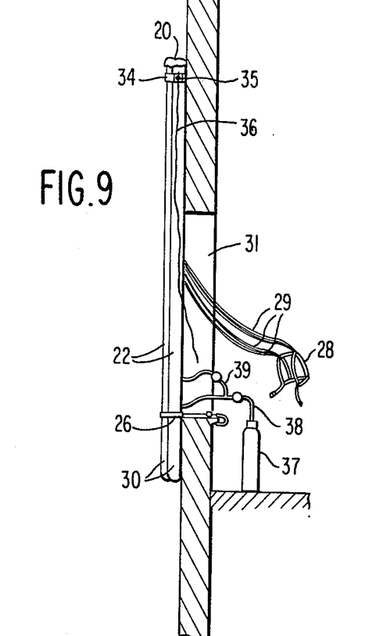
FIG. 9 is a similar view of the parachute device with its canopy support beams fully inflated but prior to their release and forced separation to expand the parachute canopy.
Figure 10:
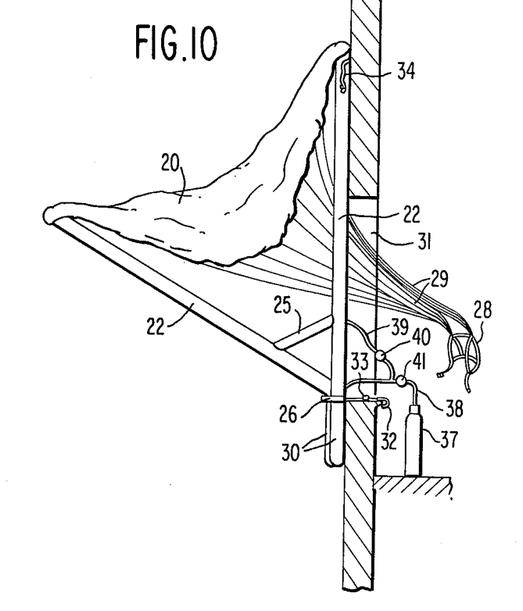
FIG. 10 is a similar view of the parachute device following the release and separation of its inflatable beams to expand the canopy.

FIG. 9 illustrates the condition of the device after complete inflation of the three beams 22 which are now upright against the exterior of the building wall with the parachute canopy 20 still confined with the beams by the band or belt 34. The device is now properly conditioned for deployment of the canopy 20 and launching, and the next step is for the user to pull the trigger line 36 and remove the pin 35 from the clasp of band 34 so as to release this band from the inflated beams 22. The released band 34 now hangs freely, as shown in FIG. 5 and 10. Immediately thereafter, the separate valve 40 in the branch supply line 39 is opened to cause inflation of the triangular array of tubes 25, and as these tubes are inflated, the already-inflated beams 22 separate and diverge upwardly to pull out and expand and support the parachute canopy ready for use as depicted in FIG. 10 and also in FIG. 5 which depicts the condition of the canopy when filled with air during a descent.

It may be noted in FIG. 10 that the parachute device is positioned for launching, although the body of the user has been omitted from the illustration for simplicity and clarity. In this connection, the general launching procedure would remain essentially similar to that shown in FIGS. 3 and 4 of the drawings. The previously-described spring action force afforded by the inflated tube cluster 10 will now be provided by the lower contiguous bent portion or portions 30 of the beams 22 below the window ledge and belt 26 and bearing against the building wall.

In brief summary, to operate the device, the user puts on the harness 28 and connects the hook extension 32 of belt 26 to the windowsill or ledge inside of the building. The user may sit or stand on the sill. The equipment is unwrapped and freed to a hanging position outside of the window 31, as shown in FIG. 7.

Next, the inflation valve 41 is a opened to inflate the three beams 22 until they assume their fully inflated positions in FIG. 9. The clasp of band 34 is then released by pulling on trigger line 36 to release pin 35. Next the inflation valve 40 is opened to cause inflation of the tubes 25 which in turn cause separation of the tops of the three beams 22 and extension or expansion of the parachute canopy 20, ready for use in an escape.

Following this procedure, all that remains to be done is to release the quick-disconnect coupling 33 of hook extension 32, separate the inflation lines from the valves 24 and 27, and jump.

In other preferred embodiments of the invention the parachute is constructed to be pre-inflatable. As may be seen in FIG. 11, the pre-inflatable parachute of the present invention is shown already unfolded but still uninflated and leaning on the windowsill 49 from which the jump can be effected.

Figure 11:
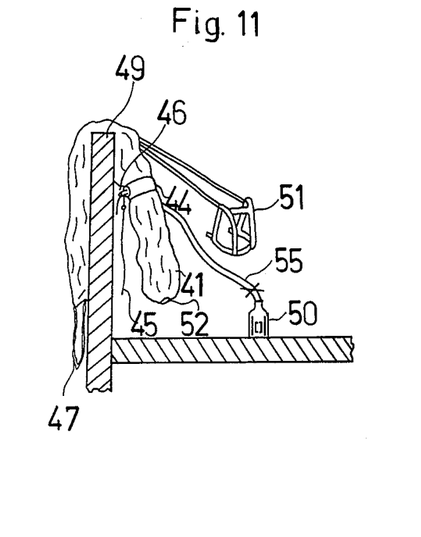
FIG. 11 shows a pre-inflatable parachute constructed in accordance with a pre-inflatable embodiment of the invention in lateral elevation view already unfolded on the windowsill before pre-inflation.

It can be seen that the canopy, which can be conventional flat circular, cross type or a non-entangling line type, has its apex 52 turned to the interior of the room and the skirt and suspension lines 47 to the opposite direction. Suspension lines 47, which can be master lines, like those of improved nonentangling parachute suspension systems. They comprise a canopy's underlying network of short prolonging lines uniting the canopy to transversal lines which are connected to a reduced number of such master suspension lines (usually fabric panels are installed in the spaces limited by these lines and the canopy's skirt).

The suspension lines 47 return to the interior of the room over the windowsill 49 and are tied on to the user's harness 51. The inflated folded tubes as well as the envolving canopy are held tightly by retaining device 44 which is a flexible band means that can be a belt, band, ribbon or bag or a combination of them that envelops the canopy and folded inflated tubes.

The retaining device 44 may be made of any adequate resistant and flexible material like natural or snythetic textiles or plastics.

Retaining device 44 surrounds the canopy and folded inflated tubes and is kept locked with a pin and lodge that can be released by pulling on line 45. The other end of releasing line 45 is tied on to a hook or other element at the window. The inflatable tubes are filled under adequate pressure with air or other gas compressed or liquidified in bottle 50. Gas is supplied through a hose to a valve 55 at the inflatable tubes.

Figure 12:
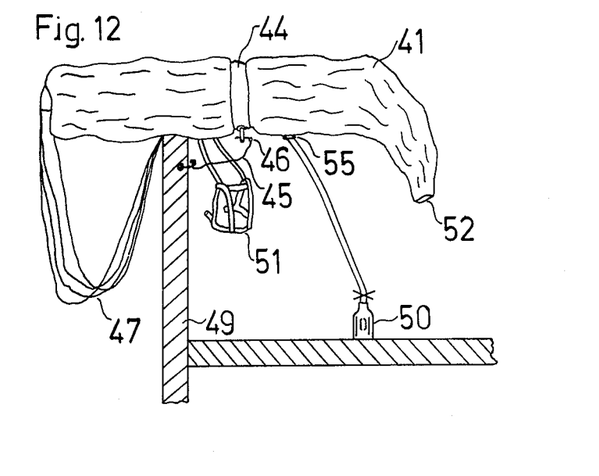
FIG. 12 shows in lateral elevation a pre-inflatable parachute of the present invention with cross shaped communicating tube frames already unfolded and pre-inflated on the windowsill and ready for the jump.

It can be seen clearly in FIG. 12 that canopy 41, still leaning on the windowsill 49, has its apex 52 turned to the interior of the room and the skirt turned to the outside, and suspension lines, which start at the skirt coming back to the room over the windowsill 49 in such a way that the harness 51 is kept inside the room ready for the user's use. The free end of releasing line 45 of retaining device 44 is tied on a hook or other fixed element at the window. The other end is tied on the canopy's retaining device pin 46. Gas pressure, as shown in FIG. 12, inflates the tubes such that they are stiff and tense but still folded by retaining device 44.

Figure 13:
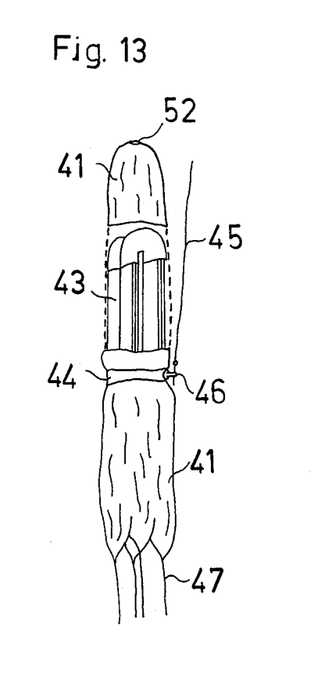
FIG. 13 is an enlarged lateral elevation view, partly broken away, of the pre-inflatable parachute of FIG. 12 showing additional details of construction and the way the tubes are arranged.

FIG. 13 shows a partial view of the equipment of FIG. 12 right after the jump. Suspension lines 47, only the upper part is shown, hang freely from the skirt and are tied on the harness (not shown) at the lower ends.

Canopy 41 is shown in a vertical position with the apex 52 at the top, still folded and envolving tubes 43 already fully inflated and retained together folded and tense with the canopy by the retaining device 44.

Retaining device's pin 46 is still in the lodge with its releasing line 45 tied on a hook or similar element at the window (not shown).

The partly broken away view of the canopy 41 shows how the communicating inflated tubes 43 are disposed. In this case the frame is cross-shaped when released, i.e., tubes 43 cross the largest plane of the canopy along diameters meeting at its center.

Figure 14:
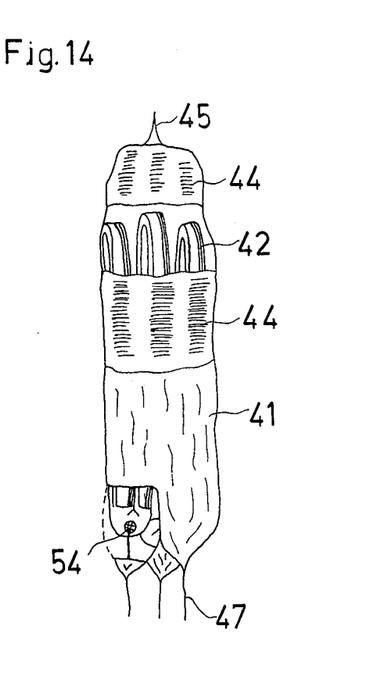
FIG. 14 is an enlarged view in lateral elevation and partly broken away of the present invention's pre-inflatable parachute having communicating tubes arranged in a triangular frame and a bag retaining device.

FIG. 14 shows a partial view of an inflatable parachute, whose communicating inflatable tubes 42 frame is disposed in a triangular array, when released, immediately after the beginning of the jump.

Suspension lines 47 (shown only upper part) hang freely from the skirt and are tied on the harness (also not shown) at the lower end. Canopy 41 is shown in a vertical position with the apex 52 at the top, still folded and envolving folded and tense tubes 42 already fully pre-inflated and retained together with the canopy by retaining device 44 which in this case is depicted as a bag. This retaining device 44 is still enveloping canopy 41 and tubes 42 with the unsheathing line 45 tied to its bottom and to a hook or similar element at or near the window (not shown). Partly broken away canopy 41 and retaining device 44 shows how the inflated communicating tubes 42 are folded and disposed.

Figure 15:
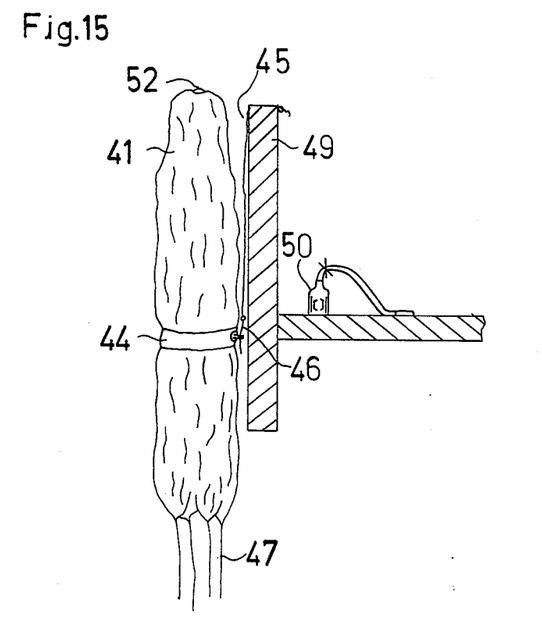
FIG. 15 is a view of the parachute shown in FIG. 12 in lateral elevation at the beginning of descent just before the pre-inflated tubes retaining device is released.

FIG. 15 shows the pre-inflated parachute of the invention right after the beginning of jump and just before the retaining device 44 is released. The gas supply bottle 50 is left in the room having been disconnected from valve 55. The position of the jumping equipment is the same shown and described in FIG. 13 and 14. It can be seen clearly in FIG. 15 that the unsheathing line 45 is fully extended and that its upper end is retained by the hook or other similar element located at or near the window. At the moment of the fall, releasing line 45 pulls off bag 44 or takes locking pin 46 out from its lodge thereby releasing retaining device 44. It is understood that the forms of the retaining device 44 are not limited to a belt with locking pin and lodge or a bag as shown on the enclosed drawings. It can have the form of bands, ribbons or others, being only essential that it retains canopy 41 envolving the folded tubes 42 or 43 in position till it is released in the way already described.

Figure 16:
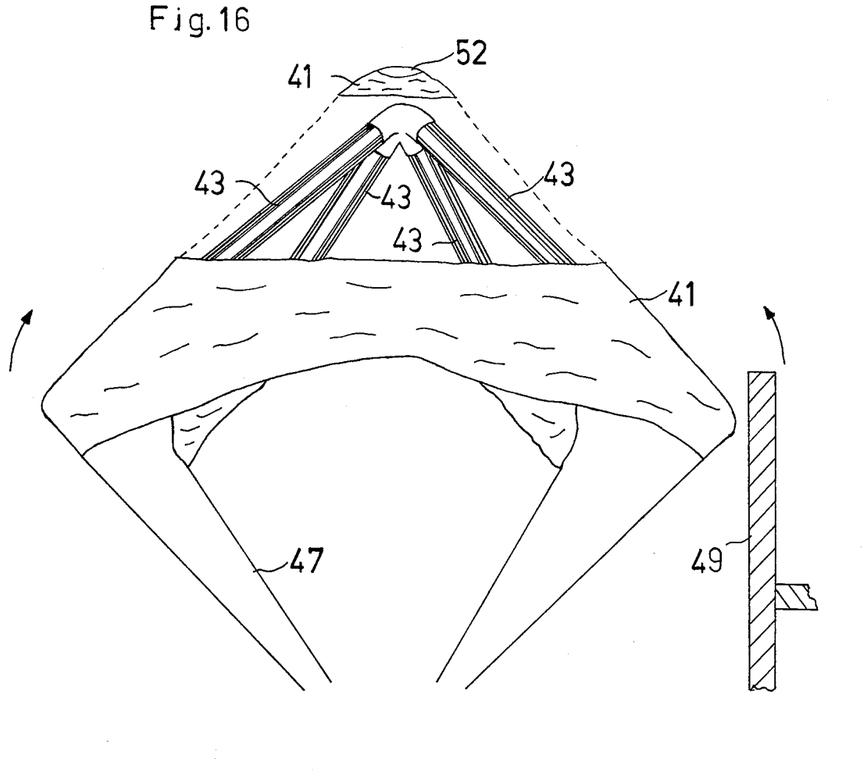
FIG. 16 is a lateral elevation view and partly broken away view of the parachute shown in FIG. 12 during the canopy's expansion soon after the pre-inflated tube's retaining device was released.

FIG. 16 shows the parachute of the present invention, with its communicating inflated tubes arranged in a cross configuration, right after the retaining device 44 is released. Folded inflated tubes 43 being tense due to accumulated potential energy, tend to assume a straight position almost instantaneously like a metalic spring once retaining device 44 is released.

Tubes 43, on straightening, expand canopy 41 almost instantaneously as soon as retaining device 44 is released at the beginning of or on the fall on account of line's 45 pull on locking pin 46 unsheathing retaining bag 44.

Figure 17:
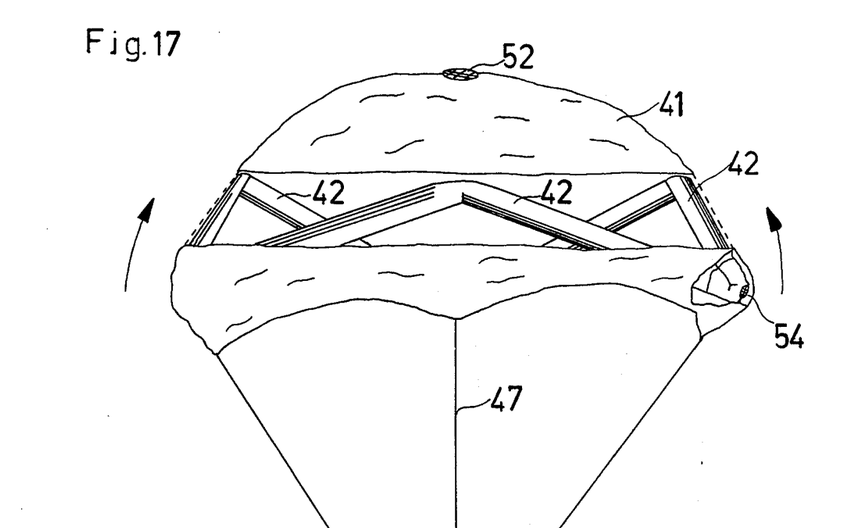
FIG. 17 is a lateral elevation and partly broken away view of the parachute shown in FIG. 14 during the canopy's expansion soon after the pre-inflated tubes retaining device was released.

FIG. 17 shows the inflatable parachute of FIG. 16 with communicating tubes 42 disposed in a triangular frame. In this case also the almost instantaneous straightening of the tubes 42 ensures a quick expansion and complete deployment of canopy 41 due to the accumulated potential energy.

Figure 18:
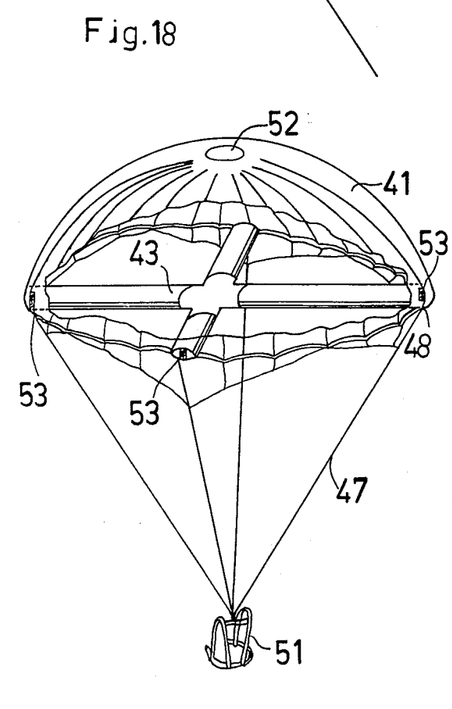
FIG. 18 is a perspective partly broken away view of the parachute shown in FIG. 12 after the canopy's complete deploying.
Figure 19:
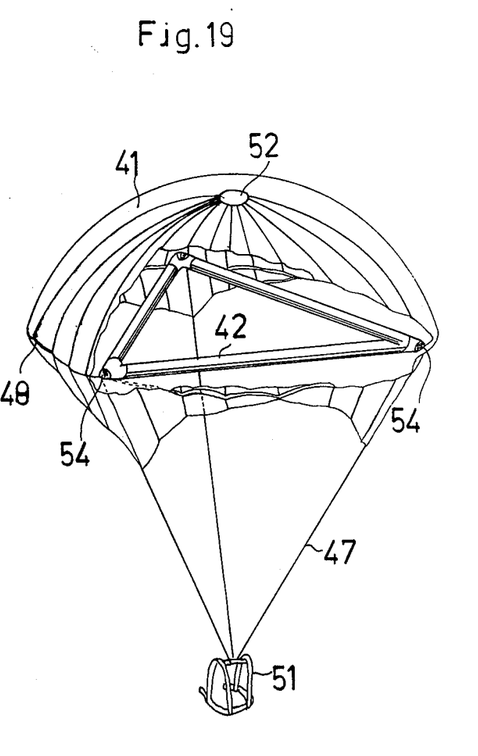
FIG. 19 is a perspective view and partly broken away view of the parachute shown in FIG. 14 after canopy's full deployment.

Finally in FIGS. 18 and 19 are shown in perspective and partly broken away. They depict, respectively, a pre-inflatable parachute with tubes 42 disposed in triangular shape and with tubes 43 assembled in cross both with the canopy 41 fully deployed in the normal descending position.

It is known by those skilled in the art that the principles of the present invention can be applied to pre-inflatable parachutes in which the inflatable tubes are disposed in other ways than those shown on the enclosed drawings as for example, radial, annular, polygonal with more than three sides and their combinations. It is also understood that the canopy can be flat circular, cross, conical, triangular or others already known. The master suspension lines 47 are preferably united to canopy's 41 skirt 48 at equidistant points 53 or 54. On these points 53 or 54 are also attached the extremities of tubes 43 or vertices of tubes 42.

In use, the parachute is unfolded on windowsill 49 or elsewhere as shown in FIG. 11 in such a way that canopy's 41 apex 52 is turned to the inside of the room. Harness 51 is also kept in the room. Releasing line 45 of retaining device 44 is then tied on the hook or other fixed element at or near the window. The user puts on harness 51 and opens gas bottle 50 valve 55 to pre-inflate parachute tubes 42 or 43. These tubes remain folded and tense on account of retaining device 44, accumulating potential energy like a metalic spring on being compressed. The gas supply is turned off and bottle 50 is disconnected once the correct pressure is attained in tubes 42 or 43. The user then jumps pulling with him suspension lines 47 and the parachute with the apex 52 up and the skirt 48 down.

At this moment, the releasing line 45 of the retaining device 44 pulls the locking pin 46 from its lodge (or pulls off the retaining bag) freeing tubes 42 or 43. Once free, tubes 42 and 43 straighten almost instantaneously due to the accumulated potential energy. Inflated tubes 42 or 43, on straightening, expand the canopy to which they are united by their extremities or vertices, ensuring the equipment's proper performance and on acting on the building's wall they pull it away avoiding therefore protruding parts.

As master suspension lines 47 are preferably united at the attachment points 53 or 54 of tubes 42 or 43 with canopy skirt 48, they get separated almost immediately when the frame of tubes straightens, therefore avoiding any entanglement at the beginning and during the descent.

It is to be understood that when the empty parachute of the present invention if folded, the canopy 41 may be folded among the inflatable tubes frame 42 or 43 before the retaining device 44 is released, but preferably the canopy 41 is initially folded enveloping those tubes.

It is to be further understood that the forms of the invention herewith shown and described are to be taken as preferred examples of the same, and that various changes in the shape, size and arrangement of parts may be resorted to, without departing from the spirit of the invention or scope of the claims.

I claim:

1. An escape or sporting parachute device comprising a parachute canopy having a body harness means suspended therefrom and attachable to the body of a user, an inflatable flexible tubing frame underlying said canopy and opening and supporting the canopy in a use position when inflated, said tubing frame including a pair of ring-like tubing elements beneath the parachute canopy, interconnecting tubing struts between the ring-like tubing elements, a suspended ring-like tubing element of reduced size spaced below the canopy to receive the waist of a user and in inflatable communication with the lowermost of said pair of ring-like tubing elements, and said tubing frame including an inflatable component which extends below said suspended ring-like tubing element and is bendable into contact with a verticle wall or the like to form a spring prelaunching positioning means for the device.

2. An escape or sporting parachute device comprising a parachute canopy having a body harness means suspended therefrom and attachable to the body of a user, an inflatable flexible tubing frame underlying said canopy and opening and supporting the canopy in a use position when inflated, said tubing frame including a pair of ring-like tubing elements beneath the parachute canopy, interconnecting tubing struts between the ring-like tubing elements, a suspended ring-like tubing element of reduced size spaced below the canopy to receive the waist of a user, and said tubing frame including plural circumferentially spaced downwardly converging tubing sections inflatably interconnecting the suspended ring-like tubing element and the lowermost of said pair of ring-like tubing elements.

3. An escape or sporting parachute device as defined by claim 2, and an inflatable member secured to one of said converging tubing sections and extending longitudinally therebelow and below the suspended ring-like tubing element and serving to assist in properly positioning the parachute for launching, and also serving to store energy, when bent into angular shape, for assisting in the launching of the device.

4. An escape or sporting parachute device as defined by claim 2, and each converging tubing section consisting of a cluster of side-by-side tubes having their ends connected into and communicating with said suspended tubing element and the lower ring-like tubing element of said pair.

5. An escape or sporting parachute device as defined by claim 4, and another cluster of side-by-side tube sections anchored to the side of one of said converging clusters and being in internal communication therewith and projecting longitudinally therebelow and below the elevation of the suspended ring-like tubing element and having a lower terminal end.

6. An escape or sporting parachute device comprising a parachute canopy having a body harness means suspended therefrom and attachable to the body of a user, an inflatable flexible tubing frame underlying said canopy and opening and supporting the canopy in a use position when inflated, said tubing frame including a pair of ring-like tubing elements beneath the parachute canopy, interconnecting tubing struts between the ring-like tubing elements, a suspended ring-like tubing element of reduced size spaced below the canopy to receive the waist of a user and in inflatable communication with the lowermost of said pair of ring-like tubing elements, a plurality of shroud lines connected with said parachute canopy and depending therefrom and carrying said body harness means adjacent to the suspended ring-like tubing element, and an inflatable bendable positioning extension adapted to be pressed against a building wall carried by said tubing frame at the lower end thereof.

7. An escape or sporting parachute device comprising a canopy, a body harness means connected with and suspended from the canopy, a flexible inflatable expansion and support frame for said canopy underlying and extending below said canopy, and a lower end extension on said inflatable frame adapted to engage a building side wall to position the device for launching by inflation thereof, said inflatable frame comprising plural circumferentially spaced tubular beams having corresponding upper ends attached to the skirt portion of the canopy, said tubular beams after inflation of the frame converging downwardly and being joined near their lower ends to provide a cluster of inflated parallel substantially contacting beam extensions.

8. An escape or sporting parachute device as defined by claim 7, and means joining the beam extensions of said cluster near their lower ends and placing the interiors of the tubular beams in communication, a first inflation valve means on one of said beams to allow inflating all of the beams substantially simultaneously, a separately inflatable structure including a second inflation valve means joined to said beams above their points of joining to provide said cluster, whereby said frame may first be inflated through the first inflation valve means and then expanded to spread the canopy by the separate inflation of said structure through said second inflation valve means.

9. An escape or sporting parachute device as defined by claim 8, and wherein said separately inflatable structure comprises an array of communicating short inflatable tubes joined end-to-end with each other in communication and also joined to said beams in non-communicating relation to the interiors of the beams.

10. An escape or sporting parachute device as defined by claim 9, and said beams being three in number and spaced apart equidistantly, and said array of inflatable tubes being a triangular array.

11. An escape or sporting parachute device as defined by claim 10, and the tops of said inflatable beams being bonded directly to the skirt portion of the parachute canopy, and the joining means for the beams at the tops of the extensions forming said cluster consisting of a belt element surrounding the beams snugly.

12. An escape or sporting parachute device as defined by claim 11, and said means joining the beam extensions near their lower ends and placing their interiors in communication comprises tubular flexible fittings secured within apertures formed in the walls of the beam extensions.

13. An escape or sporting parachute device as defined by claim 7, and a binding belt means carried by one of said tubular beams in its upper end adapted to secure the device in a compact collapsed state prior to inflation of said frame with the parachute canopy folded inwardly of and confined between said beams.

14. An escape or sporting parachute device as defined by claim 13, and a manual release means for the binding belt means operable to release said beams from said collapsed state following inflation of the beams.

15. An escape or sporting parachute device comprising a parachute canopy, plural circumferentially spaced inflatable beams having corresponding ends attached to said canopy and converging downwardly therefrom when inflated, means joining the beams near their lower ends and placing their interiors in communication, a first inflation valve on one of said beams, and a separately inflatable structure attached to the beams near and above their joined lower end portions and having a second inflation valve, whereby the beams may first be inflated and subsequently expanded by the inflation of said structure of spreading said canopy to a use position.

16. An escape or sporting parachute device as defined by claim 15, and wherein said separately inflatable structure comprises an array of communicating short inflatable tubes joined end-to-end with each other in communication and also joined to said beams in non-communicating relation to the interiors of the beams.

17. An escape or sporting parachute device as defined by claim 16, and said beams being three in number and spaced apart equidistantly, and said array of inflatable tubes being a triangular array.

18. An escape or sporting parachute device as defined by claim 15, and the tops of said inflatable beams bonded to the skirt portion of the parachute canopy, said means joining said beams including a belt element embracing the beams intermediate their lower ends and said separately inflatable structure.

19. An escape or sporting parachute device as defined by claim 18, and said means joining the beams near their lower ends including flexible tubular fittings bonded to the beam side walls and placing their interiors in communication.

20. An escape or sporting parachute device as defined by claim 15, and a binding belt means carried by one of said beams near its upper end and adapted to secure the beams and said canopy in collapsed relation prior to inflation of the beams with the canopy folded inwardly of and between the beams.

21. An escape or sporting parachute device as defined by claim 20, and a manual release means for said binding belt means operable to release the beams from their collapsed state following inflation of the beams.

22. In an inflatable type life saving or sport parachute for ejecting from a support, said parachute having a canopy with a body harness suspended therefrom, an inflatable flexible tubing frame underlying said canopy, said canopy having a skirt portion attached to said frame to extend said canopy when said frame is inflated and straightened, the improvement comprising:
said inflatable tubing frame being in a substantially completely folded position enveloped by said canopy,
means to preinflate said folded tubing frame with a gas,
a retaining device to maintain said tubing frame in said folded position enveloped by said canopy when preinflated such that said frame accumulates potential energy, and
ejection means comprising: release means to substantially instantaneously release said retaining device and use said potential energy to eject said parachute from said support by permitting said preinflated tubing frame to straighten substantially instantaneously thereby expanding said canopy and moving said canopy away from said support.

23. A device according to claim 22 wherein said retaining device is a flexible band means which retains said canopy and tubing frame folded to accumulate said potential energy.

24. A device according to claim 22 which includes suspension lines attached to the canopy's skirt at the extremities or vertices of said tubing frame.

25. A method of ejecting an inflatable type life-saving or sport parachute from a support, said parachute having a canopy with a body harness suspended therefrom, an inflatable flexible tubing frame underlying said canopy, said canopy having a skirt portion attached to said frame to extend said canopy when said frame is straightened, comprising the steps of:
folding said inflatable frame prior to ejection,
preinflating said frame with a gas while maintaining said frame folded to store potential energy, and
substantially instantaneously releasing said preinflated frame from said folded condition at the beginning of ejection from said support to expand said canopy substantially instantaneously, wherein the straightening of said frame substantially instantaneously pushes said parachute away from said support using said stored potential energy.

26. A method according to claim 25 wherein said support is a vertical surface.

27. A method according to claim 25 wherein said support is an aircraft.

28. A method according to claim 25 wherein said frame is substantially completely folded and enveloped by said canopy prior to ejection.

* * * * *